United States Patent [19]
Hagen et al.

[11] Patent Number: 5,105,693
[45] Date of Patent: Apr. 21, 1992

[54] MACHINE TOOL WITH MOVABLE POSITIONING DEVICE

[75] Inventors: Johannes L. M. Hagen; Marinus J. J. Dona, both of Eindhoven, Netherlands

[73] Assignee: U.S. Philips Corporation, New York, N.Y.

[21] Appl. No.: 619,170

[22] Filed: Nov. 26, 1990

[30] Foreign Application Priority Data

Apr. 27, 1990 [NL] Netherlands ............... 9001014

[51] Int. Cl.$^5$ .................. B23B 17/00; B23Q 1/20
[52] U.S. Cl. ............................... 82/137; 82/149; 409/241
[58] Field of Search ........... 82/117, 132, 137, 141, 82/173, 149, 133; 409/241

[56] References Cited

U.S. PATENT DOCUMENTS

| | | | |
|---|---|---|---|
| 2,994,305 | 8/1961 | Bruet | 82/132 X |
| 3,343,243 | 9/1967 | Renker | 82/133 X |
| 4,552,045 | 11/1985 | Inoue et al. | 82/19 X |
| 4,616,545 | 10/1986 | Katou et al. | 409/241 X |

FOREIGN PATENT DOCUMENTS

2250597  6/1975  France .
2400749  3/1979  France .

*Primary Examiner*—Steven C. Bishop
*Attorney, Agent, or Firm*—Brian J. Wieghaus

[57] ABSTRACT

A machine tool for machining a workpiece (11), the workpiece (11) being fastened to a support (9) which has its bearings in a frame (1) of the machine tool and is rotatable about an axis of rotation (13), while a tool (37) is movable relative to the workpiece (11) by means of a positioning device (35) provided on a carrier (17) of the machine tool. The carrier (17) is movably guided relative to the support (9) along a straight guide (23, 25) of the frame (1) in a direction parallel to the axis of rotation (13) by means of static fluid bearings (19, 21), so that a space easily accessible to an operator is created between the carrier (17) and the support (9) through displacement of the carrier (17). The carrier (17) can be coupled to the frame (1) by means of coupling members (51) provided with bolts (75), a head of each bolt (75) forming a piston (73) which can be moved in a cylinder (59), which is hinged to the carrier (17). In the operational condition of the machine tool, in which the workpiece (11) is machined with the tool (37), each bolt (75) is subjected to a tensile stress which is achieved through the supply of pressurized fluid to the cylinders (59), so that a particularly rigid coupling of the carrier (17) to the frame (1) is obtained. In particular, so-called masters for projection television screens in the form of circular Fresnel lenses of a comparatively large diameter are manufactured with these machine tools.

19 Claims, 2 Drawing Sheets

MACHINE TOOL WITH MOVABLE POSITIONING DEVICE

CROSS-REFERENCE TO RELATED APPLICATION

This application relates to U.S. application Ser. No. 07/619,169, filed simultaneously herewith on Nov. 26, 1990, entitled "Positioning Device Having a Static Fluid Bearings" which discloses and claims a positioning device for a tool of a machine tool, and to U.S. application Ser. No. 07/618,278 also filed simultaneously herewith entitled "Support Device For A Drum" which discloses and claims a support device for a rotatable drum of a machine tool.

BACKGROUND OF THE INVENTION

The invention relates to a machine tool for machining a workpiece which is fastened to a rotatable support which has its bearings in a frame of the machine tool, which machine tool is provided with a positioning device for locating a tool fastened on the positioning device relative to the workpiece, the tool being movable in at least an x-direction by means of the positioning device.

On conventional machine tools, and particularly on turning lathes, a tool such as a chisel is fastened to a transverse carriage which is movably guided along a straight guide of a longitudinal carriage in a direction transverse to a direction of a horizontal axis of rotation of the rotatable support of the workpiece. The longitudinal carriage of such a machine is movably guided along a straight guide of a frame of the machine. Such machine tools are in general only suitable for machining workpieces of a comparatively small diameter. For machining of workpieces having a comparatively large diameter, use is mostly made of machine tools fitted with a plate which is rotatable about a vertical axis of rotation for supporting the workpiece, a tool necessary for machining the workpiece being fastened to a positioning device provided at a portal-shaped construction positioned above the rotatable plate. Such machine tools provided with a horizontal plate for supporting the workpiece, however, have the disadvantage that chips formed during machining of the workpiece remain on the workpiece, which may adversely affect the quality of the workpiece. In addition, such a workpiece clamped on a horizontal plate can become deformed during clamping or removing under the influence of its own weight. Especially in the case of comparatively thin plate-shaped workpieces having a large diameter, such as, for example, masters for projection television screens in the form of so-called circular Fresnel lenses, these disadvantages can be avoided through the use of a machine tool having a plate rotatable about a horizontal axis of rotation for supporting the workpiece, the tool being movable relative to the workpiece by means of a positioning device attached to a frame of the relevant machine. Moreover, the machine operator's view of the workpiece in such a machine is generally better than in the case of a machine tool having a horizontal plate for supporting the workpiece.

Generally speaking, the latter machine tools for machining such workpieces having a comparatively large diameter have the disadvantage that the rotatable support on which the workpiece to be machined is clamped, as well as the positioning device to which the required tool is fastened are difficult to reach for a machine operator when the latter has to clamp or remove the workpiece or the tool.

SUMMARY OF THE INVENTION

The invention has for its object inter alia to provide a machine tool in which the disadvantages described above are avoided.

According to the invention, the machine tool is for this purpose characterized in that the positioning device is provided on a carrier which is movable along a flat guide of the frame in a y-direction perpendicular to the x-direction, while the machine tool is provided with coupling members for coupling the carrier to the frame.

When the carrier on which the positioning device is provided is moved relative to the frame and to the workpiece support journalled in the frame before the removal or clamping of the workpiece or the tool, a space between the support and the positioning device is created which is accessible to the machine operator. Since in addition the carrier can be coupled to the frame and forces exerted on the tool can be transmitted to the frame via the coupling members provided for that purpose, a high degree of rigidity is achieved and an accurate machining of the workpiece is possible.

A particular embodiment of a machine tool according to the invention which provides a substantially frictionless guiding of the carrier of the positioning device along the frame is characterized in that the carrier is guided along the flat guide of the frame by means of a static flid bearing. When the machine tool is in operation, the carrier being coupled to the frame and the workpiece being machined by the tool, the static fluid bearing is not operational, but the bearing can be made operational by a supply of fluid under pressure to this bearing after the carrier has been uncoupled from the frame, so that the carrier can then be moved along the guide of the frame by the exertion of a small force.

A further embodiment of a machine tool according to the invention which provides a particularly sturdy, effective and easily realisable coupling between the carrier and the frame of the machine tool is characterized in that the coupling members for coupling the carrier to the frame are provided with bolts attached to the carrier, which bolts are couplable to fastening members of the frame, each bolt being subjected to a tensile stress during operation after coupling to the frame, which tensile stress is achieved by means of hydraulic actuator having a piston which is movable by a fluid in a cylinder and is connected to the relevant bolt.

A still further embodiment of a machine tool according to the invention which provides a simple construction of the coupling members for coupling the carrier to the frame is characterized in that each of the cylinders is attached to the carrier, while a head of each bolt constitutes the piston by means of which the tensile stress is applied to the relevant bolt during operation.

A particular embodiment of a machine tool according to the invention is characterized in that the cylinders are pivotably coupled to the carrier. The use of a pivotable coupling of the cylinders to the carrier prevents undesirable stresses which may occur in the coupling members by which the carrier can be coupled to the frame.

A further embodiment of a machine tool according to the invention is characterized in that the carrier and the fastening members of the frame are provided mutually fitting with curved support surfaces which are in pressure contact with one another after coupling of the carrier to the frame and which extend around the bolts. It is achieved in this way that the carrier with the positioning device provided on it can be brought into an accurate position relative to the frame and the workpiece support having its bearings therein while being coupled to the frame. In addition, the use of the said support surfaces achieves that the transmission to the frame of the machining forces exerted on the positioning device can take place over a comparatively large surface. Undesirable pressure concentrations are avoided in this way.

BRIEF DESCRIPTION OF THE DRAWINGS

The invention will now be explained in more detail with reference to the drawing in which.

DESCRIPTION OF THE PREFERRED EMBODIMENT

Figure 1:
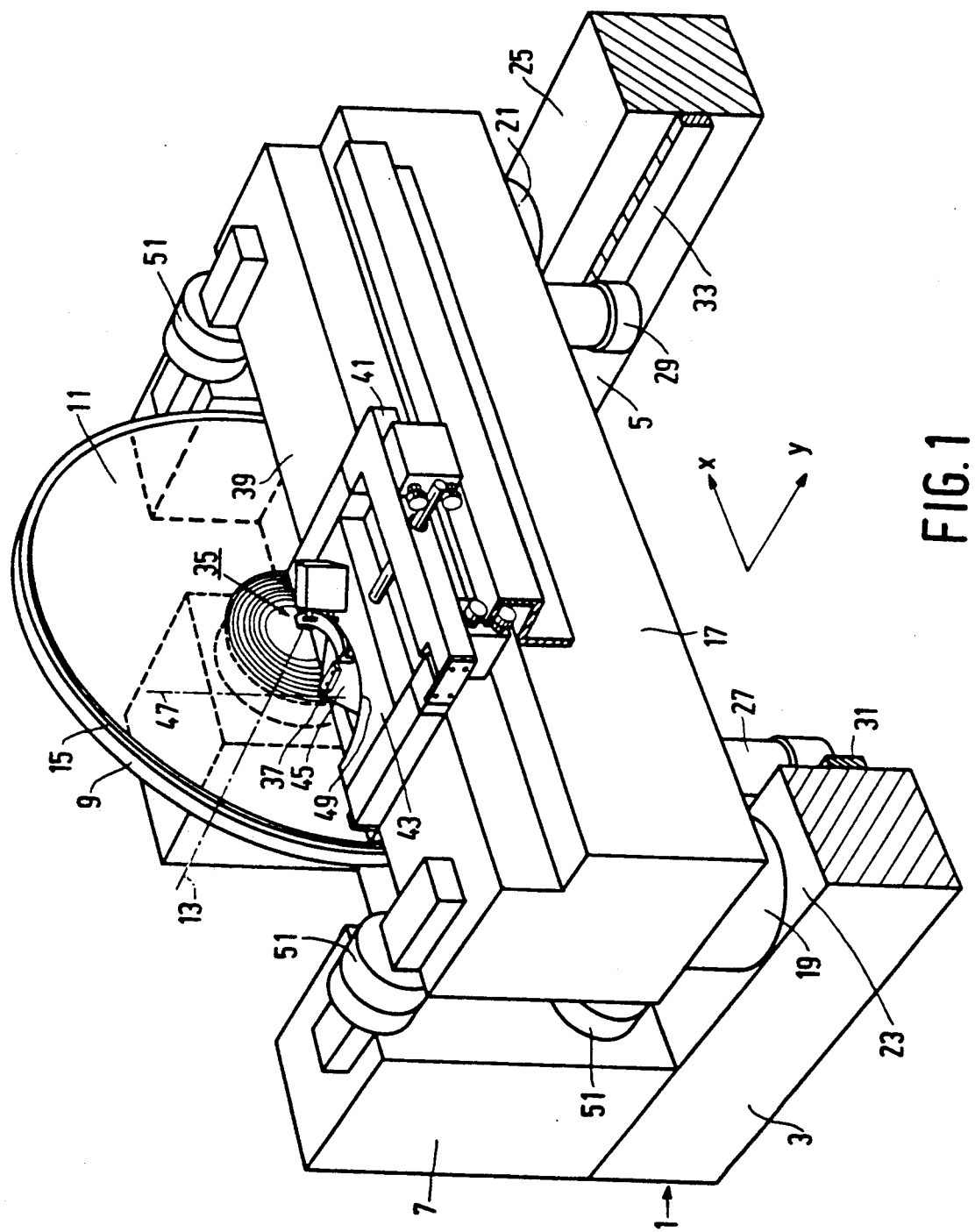
FIG. 1 diagrammatically shows an embodiment of a machine tool according to the invention.

The embodiment of the machine tool shown in FIG. 1 comprises a frame 1 which is provided with two frame blocks 3 and 5 which are situated at a distance from one another and which extend substantially parallel to one another in a horizontal direction represented as the y-direction in FIG. 1. The two frame blocks 3 and 5 are interconnected at one end of each of these frame blocks by means of a cross beam 7 which extends in a horizontal x-direction perpendicular to the y-direction indicated in FIG. 1. A vertical, disc-shaped support 9 of a plate-shaped workpiece 11 has its bearings in the cross beam 7 of the frame 1. The support 9 is rotatable about an axis of rotation 13, which is substantially parallel to the y-direction, by driving means which are not shown. The workpiece 11 in that case is fastened to a side 15 of the support 9 facing away from the cross beam 7.

A girder 17 (carrier) is provided at the side 15 of the support 9, which girder extends in the x-direction parallel to the cross beam 7. Near its two ends, the girder 17 is movably guided along a flat guide 23 of the frame block 3 and a flat guide 25 of the frame block 5 by means of static fluid bearings 19 and 21, respectively, the guides 23 and 25 being formed by upper surfaces of the frame blocks 3 and 5, which two upper surfaces are situated in a horizontal plane parallel to the x- and y-directions. The static fluid bearings 19, 21 are of a type which is known per se and are not indicated further in FIG. 1. The girder 17, as is shown diagrammatically in FIG. 1, is also provided with roller members 27 and 29 which bear on a straight guide rail 31 of the frame block 3 and a straight guide rail 33 of the frame block 5, respectively, the guide rails 31 and 33 extending parallel to the y-direction on the mutually facing lateral surfaces of the frame blocks 3 and 5. When the fluid bearings 19, 21 are operational, the girder 17 can be moved by hand by an operator of the machine tool with little force in the y-direction along the frame blocks 3 and 5, undesirable displacements in the x-direction being prevented by the guide rails 31 and 33 and the roller members 27 and 29.

The girder 17 constitutes a carrier for a positioning device 35 by which a tool 37 fastened to the positioning device 35, such as, for example, a chisel, is movable relative to the workpiece 11. A horizontal upper surface 39 of the girder 17 parallel to the x-and y-directions in that case forms a base surface along which a longitudinal carriage 41 of the positioning device 35 is movable in the x-direction and along which a transverse carriage 43 of the positioning device 35 is movable relative to the longitudinal carriage 41 in the y-direction. The tool 37 is fastened to a $\phi$-carriage 45 of the positioning device 35, which $\phi$ carriage is rotatably guided about an axis of rotation 47 indicated in FIG. 1 along the upper surface 39 of the girder 17 and along a circular cylindrical guide 49 of the transverse carriage 43. The means by which the longitudinal carriage 41, the transverse carriage 43, and the $\phi$ carriage 45 are supported, displaced and/or rotated are not important for the essence of the invention and are accordingly shown only diagrammatically in FIG. 1.

The girder 17 is coupled to the cross beam 7 of the frame 1 by means of coupling members 51 in the operational position of the machine tool represented in FIG. 1. In this operational position, the workpiece 11 fastened to the support 9 can be machined by the tool 37 fastened to the positioning device 35 through a rotational movement of the workpiece 11 about the axis of rotation 13, a feed motion of the transverse carriage 43 in the y-direction, and a displacement of the longitudinal carriage 41 in the x-direction.

Figure 2:
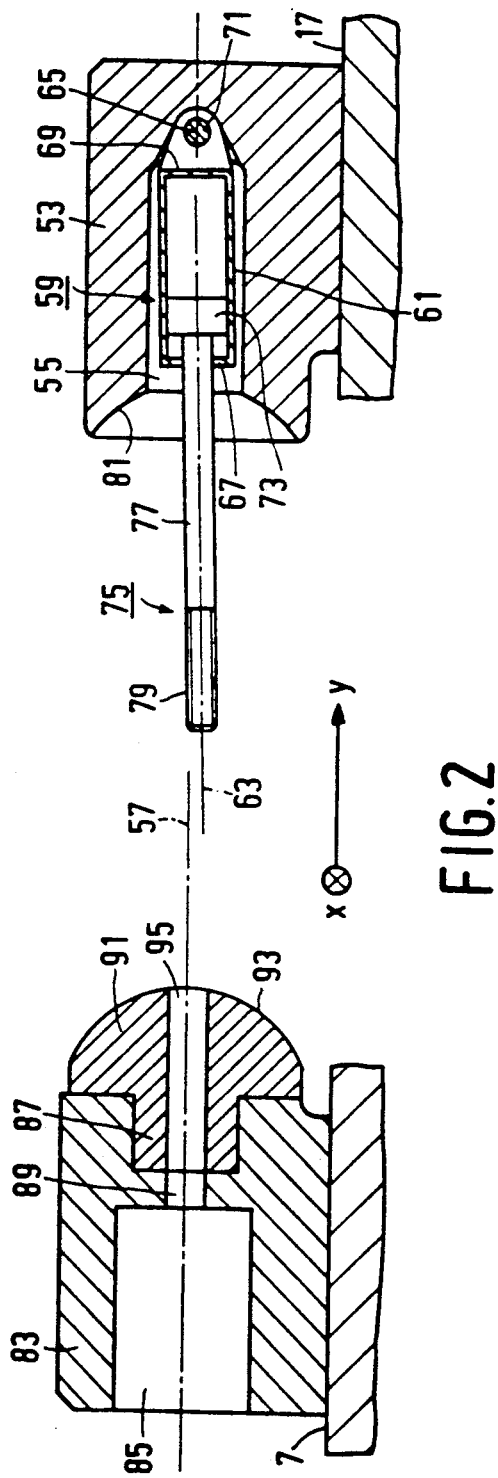
FIG. 2 shows a cross-section of one of the coupling members by which the carrier of the machine tool shown in FIG. 1 can be coupled to the frame, the components being represented at a distance from one another.
Figure 3:
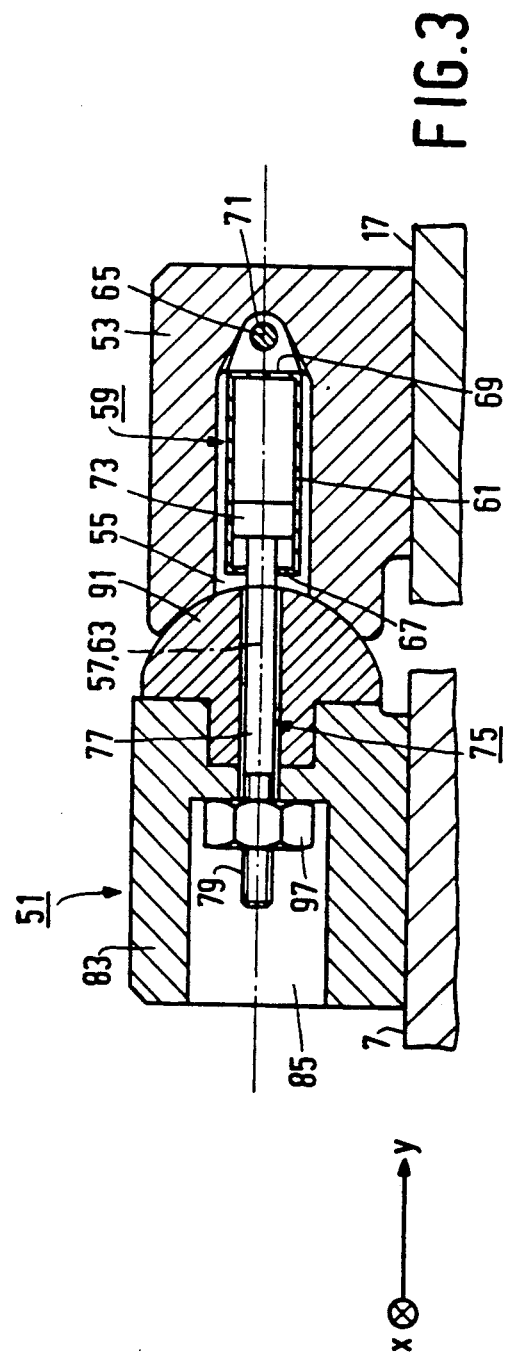
FIG. 3 shows the components shown in FIG. 2 in a position in which the carrier is coupled to the frame.

As is shown in more detail in FIGS. 2 and 3, the coupling members 51 each comprise a first block 53 attached to the girder 17 and comprising a circular cylindrical chamber 55 with a centreline 57 which is parallel to the y-direction. Inside the chamber 55 there is a cylinder 59 provided with a circular cylindrical shell 61 whose centreline 63 is situated in a plane transverse to the x-direction and intersects the centreline 57 of the chamber 55 in point of intersection 65, with a ring-shaped bottom 67 transverse to the centreline 63 of the shell 61, and with a head 69 which is hinged on the first block 53 by means of a pivot pin 71 which goes through the point of intersection 65 and extends in the x-direction. The chamber 55 surrounds the shell 61 with some clearance, so that the cylinder 59 in the situation represented in FIG. 2 can pivot through small angles about an axis which goes through the intersection point 65 and is parallel to the x-direction.

A piston 73 is present in the cylinder 59. The piston 73 is formed by a head of a bolt 75, while a rod 77 of the piston 73 is formed by a shaft of the bolt 75, whose centreline coincides with the centreline 63 of the cylinder shell 61. The rod 77 is provided with screw thread 79 at its free end.

At the side of the first block 53 facing the cross beam 7, where the rod 77 projects from the chamber 55 of the block 53, this block 53 is bounded by a first curved support surface 81 of the block 53, which support surface 81 forms a boundary of a spherical surface whose centre is situated on the centreline 63 of the cylinder shell 61.

As is shown in FIGS. 2 and 3, furthermore, the coupling members 51 each comprise a second block 83 attached to the cross beam 7 of the frame 1. A stepped bore is provided in the second block 83, whose centreline coincides with the centreline 57 of the chamber 55 of the first block 53. The said stepped bore comprises two bore portions 85 and 87 which are interconnected by a bore portion 89 whose diameter is smaller than the diameters of the bore portions 85 and 87. Inside the bore portion 87, which is situated near a side of the second block 83 facing the girder 17, a support piece 91 is attached. The boundary surface of the support piece 91 facing the girder 17 forms a second curved support surface 93 whose shape is complementary to that of the first support surface 81 of the first block 53. The support piece 91 is further provided with a bore 95 which is situated in the extended direction of the bore portion 89 of the second block 83 and whose diameter equals the diameter of the bore portion 89.

In the operational position of the machine tool mentioned above, in which the girder 17 is coupled to the cross beam 7 by means of the coupling members 51, the various parts of the coupling members 51 occupy positions as represented in FIG. 3, a nut 97 being tightened by hand on the end of the rod 77 provided with screw thread 79 and present in the bore portion 85 of the second block 83. In the operational position, a pressurized fluid will be supplied to the cylinder 59 between the piston 73 and the bottom 67 in order to maintain a considerable tensile stress in the rod 77, so that a particularly rigid and strong coupling of the girder 17 to the cross beam 7 of the frame 1 is achieved. Undesirable stresses in the parts of the coupling members 51 are avoided through the use of the said hinged connection between the cylinder 59 and the girder 17. The two mutually fitting curved support surfaces 81 and 93 are in pressure contact with one another in the operational position. The support surfaces 81, 93 are manufactured accurately and are provided in an accurate position relative to the girder 17 and the cross beam 7, respectively. Thus, the girder 17 with the positioning device 35 provided on it is arranged in an accurate position relative to the cross beam 7 of the frame 1 with the support 9 of the workpiece 11 journalled in it, which renders possible an accurate positioning of the tool 37 relative to the workpiece 11 by means of the positioning device 35.

If an operator of the machine tool wants to fasten a workpiece to the support 9 or wants to remove a workpiece from the support 9, the fluid present between the pistons 73 and the bottoms 67 in the cylinders 59 of the coupling members 51 is first depressurized, upon which the nuts 97 are unscrewed from the rods 77. Then the static fluid bearings 19 and 21 are activated, after which the girder 17 with the positioning device 35 is moved along the flat guides 23 and 25 of the frame blocks 3 and 5 by hand in a direction away from the support 9 over such a distance that the space thus created between the girder 17 and the support 9 is accessible to the operator for fastening the workpiece to or removing it from the support 9. When the girder 17 is at a certain distance from the support 9, the static fluid bearings 19 and 21 can be de-activated, so that then the girder 17 will rest squarely on the frame blocks 3 and 5. In this position of the girder 17 relative to the support 9, the operator of the machine tool is also capable of fastening a tool to or removing it from the positioning device 35 in a simple manner.

To make the machine tool operational again after a workpiece has been fastened to the support 9 or a tool to the positioning device 35, the operator of the machine tool will again activate the static fluid bearings 19 and 21, and move the girder 17 towards the support 9 in such a way that the rods 77 of the coupling members 51 return to the position shown in FIG. 3. The nuts 77 are then screwed on the ends of the rods 77 again by hand, after which pressurized fluid is supplied to the cylinders 59 of the coupling members 51 between the pistons 73 and the bottoms 67. The rods 77 are tensioned again in this way, so that a rigid and accurate coupling of the girder 17 to the cross beam 7 of the frame 1 is realised.

The machine tool described above comprises a vertically arranged disc-shaped support on which a plate-shaped workpiece is clamped. More particularly, so-called masters for projection television screens in the form of circular Fresnel lenses are manufactured with these machine tools by means of a cutting operation. It should be noted that other embodiments of machine tools are also possible, provided with a carrier on which a positioning device for a tool is present and which is movable relative to the workpiece, while a space accessible to an operator of the machine tool is created through displacement of the carrier relative to the workpiece. Thus, the machine tool may be provided with, for instance, a drum-shaped support rotatable about a horizontal axis of rotation with a flexible, plate-shaped workpiece clamped around this support, the carrier of the positioning device being displaceable along a straight guide of the frame in a direction transverse to the said axis of rotation. With such a machine tool, for example, masters for linear Fresnel lenses may be manufactured through a cutting operation of the tool.

It should further be noted that the carrier of the positioning device may also be guided along the frame in a conventional manner such as, for example, by means of roller members attached to the carrier and guide rails attached to the frame blocks. If these types of guidance are used, an operator of the machine tool will have to exert a greater force on the carrier when displacing the latter than in the case of static fluid bearings.

It should be noted that the static fluid bearings by which the carrier of the positioning device is guided along the frame blocks may also be operational in the operational condition of the machine tool described above. Coupling of the carrier to the frame in this condition takes place exclusively through the said coupling members, so that an optimal positioning accuracy is achieved.

Finally, it should be noted that the coupling members described above provide a particularly rigid, accurate, and relatively simple coupling between the carrier and the frame. Obviously, other coupling members such as, for example, coupling members provided with electromagnetic couplings of a known type, may be used. An accurate positioning of the carrier relative to the frame may be achieved in a simple manner with the use of these alternative coupling members through the use of the said accurately mating support surfaces.

We claim:

1. A machine tool for machining a workpiece, said machine tool comprising a frame, a rotatable support for holding a workpiece and having bearings fixed in said frame of the machine tool, a positioning device for locating a tool fastened on the positioning device relative to the workpiece, the tool being movable in at least a first direction by means of the positioning device, characterized in that: a carrier movable along a planar guide of the frame in a second direction perpendicular to the first direction holds said positioning device; and, coupling means for locking the carrier to the frame to securely seat said carrier against said frame, said coupling means being pivotably connected to said carrier.

2. A machine tool as claimed in claim 1, characterized in that the carrier is guided along the flat guide of the frame by means of a static fluid bearing.

3. A machine tool as claimed in claim 1, characterized in that said coupling means comprises fastening members on said frame, said fastening members and said carrier comprising mutually fitting curved support surfaces which are in pressure contact with one another after coupling of the carrier to the frame.

4. A machine tool as claimed in claim 3, characterized in that said coupling means for coupling the carrier to the frame comprise bolts attached to the carrier, which bolts are couplable to said fastening members on said frame, and a hydraulic actuator connected to each bolt for imparting a tensile stress during operation after coupling to the frame.

5. A machine tool as claimed in claim 4, characterized in that each of the hydraulic actuators comprises a piston, and a cylinder attached to the carrier, while a head of each bolt constitutes the piston by means of which the tensile stress is applied to the relevant bolt during operation.

6. A machine tool as claimed in claim 1, characterized in that said coupling means for locking the carrier to the frame comprise bolts attached to the carrier, fastening members on said frame to which said bolts are coupled, and a hydraulic actuator connected to each bolt for imparting a tensile stress during operation after coupling to the frame.

7. A machine tool as claimed in claim 6, characterized in that each of the hydraulic actuators comprises a piston, and a cylinder attached to the carrier, while a head of each bolt constitutes the piston by means of which the tensile stress is applied to the relevant bolt during operation.

8. A machine tool having an operator-moveable tool carrier, comprising:
   a) a frame, said frame comprising a pair of elongate guide blocks, said frame blocks being spaced from each other and having a plurality of elongate guide surfaces, and a fixed transverse frame member spanning between and fixed on said guides blocks;
   b) a rotatable support fixed to said transverse frame member and rotatable about an axis of rotation between to said guide blocks, said rotatable support being disposed between said guide blocks substantially perpendicular to said blocks and comprising means for holding a work piece for rotation about said axis of rotation;
   c) an operator-moveable tool carrier spanning between said guide blocks, said tool carrier comprising
      a moveable transverse frame member spanning between said guide blocks,
      bearing means disposed between said moveable frame member and said guide blocks and cooperable with said guide surfaces of said guide blocks such that said carrier is moveable under the force of a human operator on said guide blocks towards and away from said fixed transverse frame member and said rotatable support,
      a tool positioning device mounted on said carrier for positioning a tool along an axis perpendicular to said axis of rotation for engaging a workpiece held in said support,
      said tool carrier being displaceable on said guide blocks away from said transverse frame member a sufficient distance to allow a human operator to gain access to said workpiece; and
   d) coupling means for locking said moveable tool carrier to said frame and for accurately seating said carrier to said transverse frame member, said coupling means being readily uncouplable by a human operator to permit said operator to bias said tool carrier on said frame blocks away from said first transverse frame member and said workpiece to gain access to said workpiece and readily couplable after said operator has biased said tool carrier against said transverse frame member to lockingly seat said tool carrier against said transverse frame member.

9. A machine tool according to claim 8, wherein said coupling means comprises fastening members on said fixed transverse frame member, bolts attached to said moveable tool carrier and couplable to said fastening members, and a respective hydraulic actuator connected to each bolt for imparting tensile stress in each bolt to seat said tool carrier against said transverse frame member.

10. A machine tool as claimed in claim 9, characterized in that the carrier and the said fastening members on said transverse frame member comprise mutually fitting curved support surfaces which are in pressure contact with one another after coupling of the carrier to the frame.

11. A machine tool as claimed in claim 9, characterized in that said hydraulic actuators are pivotably coupled to the carrier.

12. A machine tool as claimed in claim 9, characterized in that each of the hydraulic actuators comprises a piston, and a cylinder attached to the carrier, while a head of each bolt constitutes the piston by means of which the tensile stress is applied to the relevant bolt during operation.

13. A machine tool as claimed in claim 12, characterized in that the said coupling means are pivotably coupled to the carrier.

14. A machine tool as claimed in claim 13, characterized in that the carrier and said fastening members on said transverse frame member comprise mutually fitting curved support surfaces which are in pressure contact with one another after coupling of the carrier to the frame.

15. A machine tool as claimed in claim 14, characterized in that the carrier is guided along the flat guide of the frame by means of a static fluid bearing.

16. A machine tool as claimed in claim 8, characterized in that the cylinders are pivotably coupled to the carrier.

17. A machine tool as claimed in claim 16, characterized in that the carrier and the fastening members of the frame are provided with mutually fitting curved support surfaces which are in pressure contact with one another after coupling of the carrier to the frame and which extend around the bolts.

18. A machine tool as claimed in claim 8, characterized in that said coupling means comprises fastening members on said transverse frame member, said fastening members and said carrier comprising mutually fitting curved support surfaces which are in pressure contact with one another after coupling of the carrier to the frame.

19. A machine tool as claimed in claim 8, characterized in that the carrier is guided along the flat guide of the frame by means of a static fluid bearing.

* * * * *